Aug. 29, 1961   R. F. BRENNEN ET AL   2,998,507
WELDING ELETRODE FEEDER

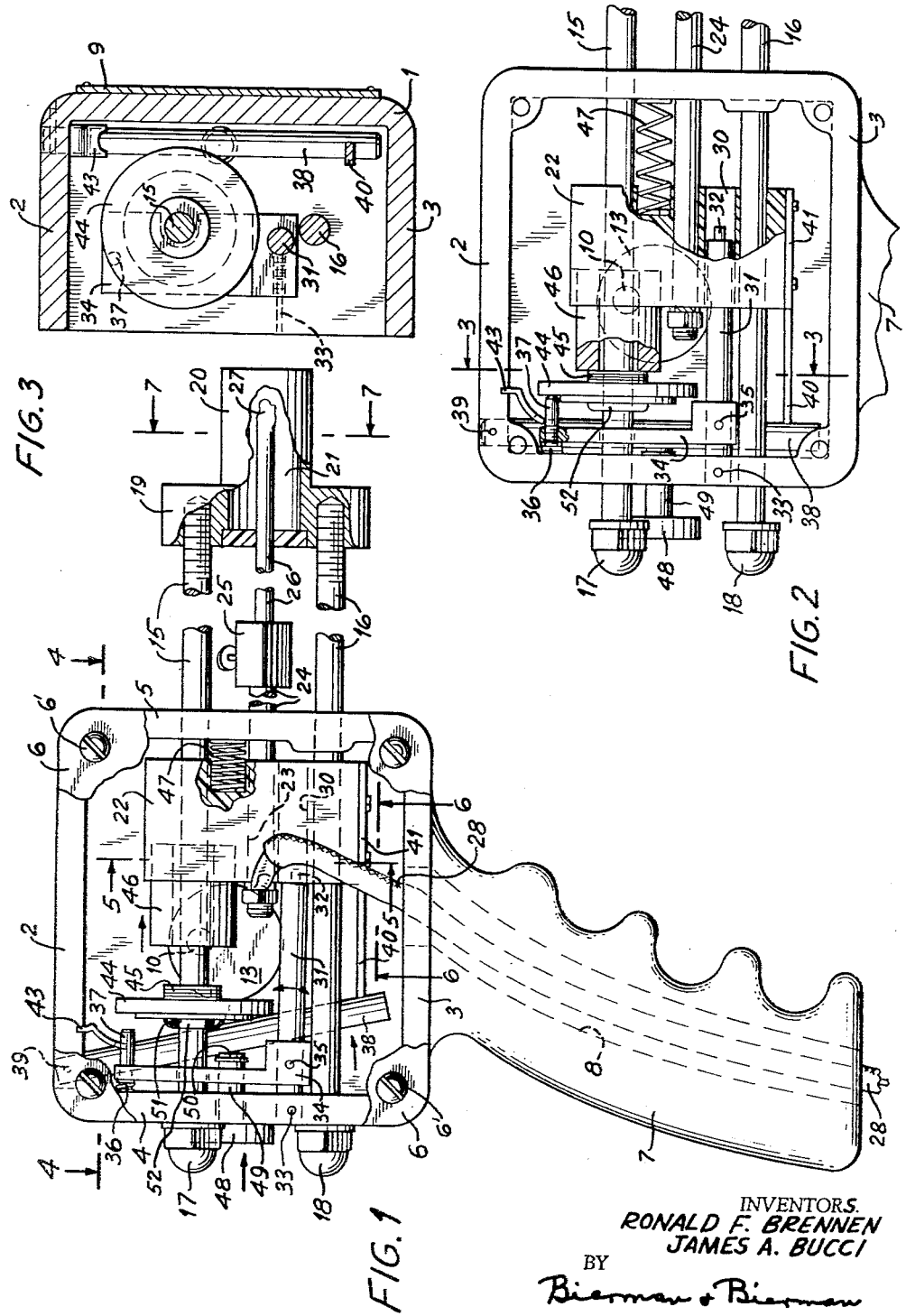

Filed Nov. 3, 1959   2 Sheets-Sheet 2

INVENTORS.
RONALD F. BRENNEN
JAMES A. BUCCI
BY
Bierman + Bierman
ATTORNEYS

United States Patent Office 2,998,507
Patented Aug. 29, 1961

2,998,507
WELDING ELECTRODE FEEDER
Ronald F. Brennen, 964 E. 16th St., and James A. Bucci, 2360 McDonald Ave., both of Brooklyn, N.Y.
Filed Nov. 3, 1959, Ser. No. 850,640
16 Claims. (Cl. 219—130)

The present invention is directed to welding and more particularly to electric arc welding with automatic control of the amount of electrode feed.

It is among the objects of the invention to provide an apparatus which may be held in the hand, which is well balanced, and which is readily adjustable to regulate the amount of feed of electrode in each welding operation.

It is also among the objects of the invention to provide an apparatus which is compact, positive in its operation, and of sturdy construction.

In practicing the invention we provide a hollow, preferably rectangular, casing open at one side for access to the interior thereof and having a depending handle or hand grip. Extending horizontally through the ends of the casing are a pair of parallel guide rods which are adapted to slide. The ends thereof terminate in a hollow nose. Within the casing is a block of insulating material to which is secured one end of an electrode holder, the other end projecting through the end wall of the casing between the guide rods and having an electrode held therein, the electrode terminating within the hollow nose. The block is slideably mounted on the guide rods so that the block and electrode are movable relative to the guide rods and the casing.

Within the casing a latch, in the form of a rod, is pivoted at one end to the casing and enters an opening in the block. A shoulder on the rod acts to latch the block in its re-set position. Operating means for the latch consists of an arm or plate, which is spring pressed. Finger operable means are provided to move the block into position to be held by the latch. Adjusting means to predetermine the amount of electrode to be consumed are incorporated in the casing. The release of the block at the end of a welding operation is obtained by a disk on one of the guide rods contacting the latch mechanism, whereby the block and electrode are retracted to extinguish the welding arc.

The invention is more fully described in connection with the accompanying drawings constituting a part hereof and in which like reference characters indicate like parts, and in which—

FIG. 1 is a side elevational view of an apparatus made in accordance with the present invention, some parts being broken away and some parts being shown in section for clearness, the elements being in re-set position ready for welding;

FIG. 2 is a fragmentary side elevational view of the casing showing the elements in the released position at the completion of the welding;

FIG. 3 is a vertical cross-sectional view taken along line 3—3 of FIG. 2;

FIG. 4 is a horizontal cross-sectional view taken along line 4—4 of FIG. 1;

FIG. 5 is a vertical cross-sectional view through the block and taken along line 5—5 of FIG. 1;

FIG. 6 is a side elevational view of the contact finger on the block for operation by the re-set mechanism;

FIG. 7 is an end view in cross-section taken along line 7—7 of FIG. 1, and

FIG. 8 is an enlarged cross-section taken along line 8—8 of FIG. 4.

With reference to the drawings, the casing consists of a back 1, top 2, bottom 3 and ends 4 and 5. The open front is closed by cover 6 held by screws 6'. A hollow handgrip 7 integral with the bottom 3 of the casing has an opening 8 therethrough. Plate 9 on back 1 has indicia thereon for calibrating the amount of electrode to be consumed in a welding operation. Stub shaft 10 passing through back 1 has pointer 11 fixed thereon by set screw 12. Cam 13 on the inside of back 1 is held on stub 10 by set screw 14.

A pair of guide rods 15 and 16 in parallel relation pass through ends 4 and 5 of the casing and have heads 17 and 18, respectively, to prevent accidental shifting of the rods out of end 4. The free ends of the rods are threaded into base 19 of nose 20 having hollow portion 21. Block 22 of insulating material, and preferably of rectangular shape, has a pair of openings through which rods 15 and 16 extend sufficiently loosely so as to provide relative sliding movement. In opening 23 of block 22 is fixed the end of conductor rod 24 bearing clamp 25 at its free end on the outside of the casing, said clamp gripping electrode 26, the end of which terminates in hollow 21 of nose 20. Cable 28 is secured to conductor 24 and extends through opening 8 to a source of welding current.

In block 22 is a latch guide opening 30 adapted to receive latch rod 31 having a reduced end 32 forming a latch shoulder adapted to be set on the face of block 22 as seen in FIG. 1 to hold the block in latched position. The rear of latch 31 is pivoted on the casing end 4 by pin 33. An operating plate 34 is fixed on latch 31 by set screw or dowel 35. Spring 36 at the free end of plate 34 biases the latch into operative position. A stop 37 extends from the plate.

Bar 38 is pivoted by pin 39 at the top corner of the casing, the free end thereof contacting finger 40 of plate 41 attached to the bottom of block 22 by rivets or the like 42. Spring 43 biases bar 38 away from finger 40. Loosely mounted on guide rod 15 is disk 44 and also insulating rings 45. Magnet 46 secured in block 22 extends in the direction of disk 44 which is of ferrous metal attracted by said magnet. Rings 45 act as a spacer to prevent actual contact of the magnet and the disk. In its rearmost position disk 44 contacts stop 37. Spring 47 placed between end 5 of the casing and block 22 biases it rearwardly against the latch. Re-set button 48 on the outside of end 4 has a stem 49 passing loosely through a hole in said end, has a groove at the free end into which a spring ring or washer 50 is inserted to prevent the stem from accidental removal from the end 4. Stem 49 is in contact with bar 38.

In operation, pointer 11 is turned to designate the amount of electrode to be consumed, causing cam 13 to be set in the position shown in FIG. 1. Re-set button 48 is pushed in with the thumb causing bar 38 to contact finger 40 and move block 22 forward until shoulder 32 is out of opening 30. The action of spring 36 tends to move latch 31 downward causing shoulder 32 to engage the face of block 22 and latch it in forward position as shown in FIG. 1, disk 44 contacting cam 13.

The operator, gripping handle 7, presses nose 20 against the work and turns on the welding current. As the electrode burns away, rods 15 and 16 retract carrying disk 44 rearwardly until it contacts stop 37, causing the disk to become cocked and thus temporarily locked on rod 15, thereby pressing on stop 37 and moving latch 32 into inoperative position in line with opening 30 releasing block 22 and causing it under action of spring 47 to move rearwardly, pulling electrode 26 back and extinguishing the arc. Magnet 46 moves into contact with rings 45 and tends to attract disk 44. The elements are now in the position shown in FIG. 2.

In re-setting the apparatus, button 48 is pressed, moving block 22 forwardly. Magnet 46 causes disk 44 to move forward with it due to the magnetic attraction and the loose mounting of the disk on rod 15, until the disk contacts cam 13, becoming cocked after it strikes stop 37 and it remains in position for the next welding cycle. In order to prevent disk 44 from slipping along rod 15 while it is loose, an elastic O-ring 51 is held by guard 52 and frictionally engaging rod 15. However, the magnet 46 is sufficiently powerful to overcome this friction.

We claim:

1. Apparatus for feeding welding electrodes comprising a casing, means for gripping said casing, a slideable guide rod extending through the ends of said casing, an insulating block in said casing slideably mounted on said rod, an electrode holder having one end secured to said block and extending through said casing at the end thereof adjacent to said guide rod, a latch mounted in said casing and extending to said block for holding said block in adjusted position, manual latch setting means to hold said block in re-set position, a disk mounted on said guide rod, a stop on said latch setting means adapted to be contacted by said disk and release said latch, means between said casing and block whereby said block is automatically retracted, and means for adjusting the travel of said disk.

2. Apparatus for feeding welding electrodes according to claim 1 in which a cam is mounted on said casing in the path of said disk constitutes said means for adjusting the position of said cam to determine the travel of said disk.

3. Apparatus for feeding welding electrodes according to claim 1 in which a spring bearing against said block biases the same towards said disk.

4. Apparatus for feeding welding electrodes according to claim 1 in which a permanent magnet on said block adjacent to said disk is adapted to pull said block toward said disk upon release of said latch, said disk being of ferrous material.

5. Apparatus for feeding welding electrodes according to claim 1 in which a permanent magnet on said block adjacent to said disk is adapted to pull said block toward said disk upon release of said latch, said disk being of ferrous material, and a non-conductor on said rod in contact with said disk and adapted to be contacted by said magnet for preventing actual contact between said magnet and disk.

6. Apparatus for feeding welding electrodes according to claim 1 in which one end of said latch is pivoted on said casing, the other end thereof extending into an opening in said block, a shoulder on said other end of said latch adapted to be shifted from said opening into the face of said block to hold the same in adjusted position.

7. Apparatus for feeding welding electrodes according to claim 1 in which one end of said latch is pivoted on said casing, the other end thereof extending into an opening in said block, a shoulder on said other end of said latch adapted to be shifted from said opening onto the face of said block to hold the same in adjusted position, a plate secured to said one end of said latch, said stop being secured to said plate adjacent to said disk.

8. Apparatus for feeding welding electrodes according to claim 1 in which said manual re-setting means includes a bar pivoted at one end on said casing, the free end thereof contacting a portion of said block.

9. Apparatus for feeding welding electrodes according to claim 1 in which said manual re-setting means includes a bar pivoted at one end on said casing, the free end thereof contacting a portion of said block and a spring biasing said bar toward said portion.

10. Apparatus for feeding welding electrodes according to claim 1 in which said manual re-setting means includes a bar pivoted at one end on said casing, the free end thereof contacting a portion of said block, a re-set button on the outside of said casing and having a stem extending through the wall of said casing in contact with said bar, whereby pressure on said button moves said block to allow said latch to operate to retain said block in position.

11. Apparatus for feeding welding electrodes according to claim 1 in which one end of said latch is pivoted on said casing, the other end thereof extending into an opening in said block, a shoulder on said other end of said latch adapted to be shifted from said opening onto the face of said block to hold the same in adjusted position, a plate secured to said one end of said latch, said stop being secured to said plate adjacent to said disk, and a spring located between said casing and said plate to bias said latch into operative position.

12. Apparatus for feeding welding electrodes according to claim 1 in which said manual re-setting means includes a bar pivoted a one end on said casing, the free end thereof contacting a portion of said block, a re-set button on the outside of said casing and having a stem extending through the wall of said casing in contact with said bar, whereby pressure on said button moves said block to allow said latch to operate to retain said block in position, a groove in said stem at the end thereof, a spring ring in said groove to retain said stem from accidental removal from said casing.

13. In an apparatus for feeding welding electrodes having a casing, a slidable guide and a block in said casing slidably mounted on said guide, the improvement which comprises an opening in said block, a latch mounted in said casing in operative relation to said opening, means for manually setting said latch on the face of said block adjacent said opening, and means operated by said guide for releasing said latch on movement of said guide and causing said latch to enter said opening.

14. In an apparatus for feeding welding electrodes having a casing, a slidable guide and a block in said casing slidably mounted on said guide, the improvement which comprises an opening in said block, a latch mounted in said casing in operative relation to said opening, means for manually setting said latch on the face of said block adjacent said opening including a bar pivoted on said casing and adapted to contact said block, a manually operable stem mounted in said casing and contacting said bar, and means operated by said guide for releasing said latch on movement of said guide and causing said latch to enter said opening.

15. In an apparatus for feeding welding electrodes having a casing, a slidable guide and a block in said casing slidably mounted on said guide, the improvement which comprises a magnet on said block adjacent said guide, an opening in said block, a latch mounted on said casing in operative relation to said opening, means for setting said latch on said block adjacent said opening, a latch operating device on said casing adjacent said guide, a disk loosely mounted on said guide between said magnet and device, and means for setting said disk in predetermined position on said guide.

16. In an apparatus for feeding welding electrodes having a casing, a slidable guide and a block in said casing slidably mounted on said guide, the improvement which comprises a magnet on said block adjacent said guide, an opening in said block, a latch mounted on said casing in operative relation to said opening, means for setting said latch on said block adjacent said opening, a latch operating device on said casing adjacent said guide, a disk loosely mounted on said guide between said magnet and device, insulation on the face of said disk adjacent said magnet, whereby said magnet is prevented from contacting said disk but permitting said magnet to attract said disk, and means for setting said disk in predetermined position on said guide.

References Cited in the file of this patent

UNITED STATES PATENTS

| | | |
|---|---|---|
| 2,110,832 | Hogg et al. | Mar. 8, 1938 |
| 2,474,531 | Keir et al. | June 28, 1949 |
| 2,817,003 | Dusek | Dec. 17, 1957 |
| 2,898,445 | Slezak | Aug. 4, 1959 |
| 2,917,618 | Brennen et al. | Dec. 15, 1959 |